Figure 4:
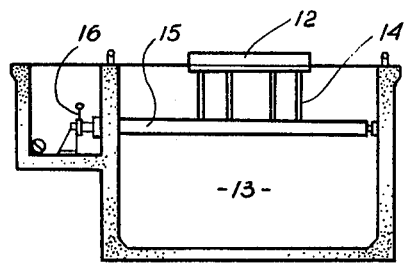

United States Patent [19]

Brown et al.

[11] Patent Number: 4,468,327
[45] Date of Patent: Aug. 28, 1984

[54] EFFLUENT TREATMENT

[76] Inventors: Arthur D. Brown; Stephen G. B. Jones, both of 65 Ocean Ave., Double Bay, New South Wales 2028, Australia

[21] Appl. No.: 471,907

[22] Filed: Mar. 9, 1983

Related U.S. Application Data

[63] Continuation of Ser. No. 323,592, Nov. 20, 1981, abandoned, which is a continuation of Ser. No. 224,862, Jan. 14, 1981, abandoned, which is a continuation of Ser. No. 81,293, Oct. 2, 1979, abandoned.

[30] Foreign Application Priority Data

Oct. 3, 1978 [AU] Australia ............................. PD6206
Feb. 16, 1979 [AU] Australia ............................. PD7708

[51] Int. Cl.³ ............................................. C02F 3/12
[52] U.S. Cl. .................................. 210/626; 210/610; 210/629
[58] Field of Search ............... 210/614, 620, 626, 627, 210/628, 629, 138, 139, 195.3, 220, 538, 610, 611

[56] References Cited

U.S. PATENT DOCUMENTS

| | | | |
|---|---|---|---|
| 3,133,017 | 5/1964 | Lambeth | 210/629 |
| 3,151,063 | 9/1964 | Gunson | 210/626 |
| 3,215,276 | 11/1965 | Lind | 210/220 |
| 3,460,677 | 8/1969 | Fifer | 210/220 |
| 3,470,092 | 9/1969 | Bernard | 210/620 |
| 3,649,531 | 3/1972 | Brown | 210/630 |
| 3,732,160 | 5/1973 | Klock | 210/629 |
| 3,809,245 | 5/1974 | Kennedy | 210/220 |
| 3,875,056 | 4/1975 | Inglis | 210/138 |
| 4,081,368 | 3/1978 | Block | 210/629 |
| 4,179,366 | 12/1979 | Kaelin | 210/614 |

Primary Examiner—Ernest G. Therkorn
Attorney, Agent, or Firm—Ladas & Parry

[57] ABSTRACT

An effluent treatment system using a tank having a length between 3.5 and 6 times its width with an inlet at one end, a surface decanter at the other end, and submerged diffused aeration nozzles. Effluent input is continuous and cyclic operation involves air diffusion, rest period and then decanting. Transverse baffles may be used in the tank to cope with shock organic loads obviating the need for hydraulic or organic pre-balancing.

10 Claims, 7 Drawing Figures

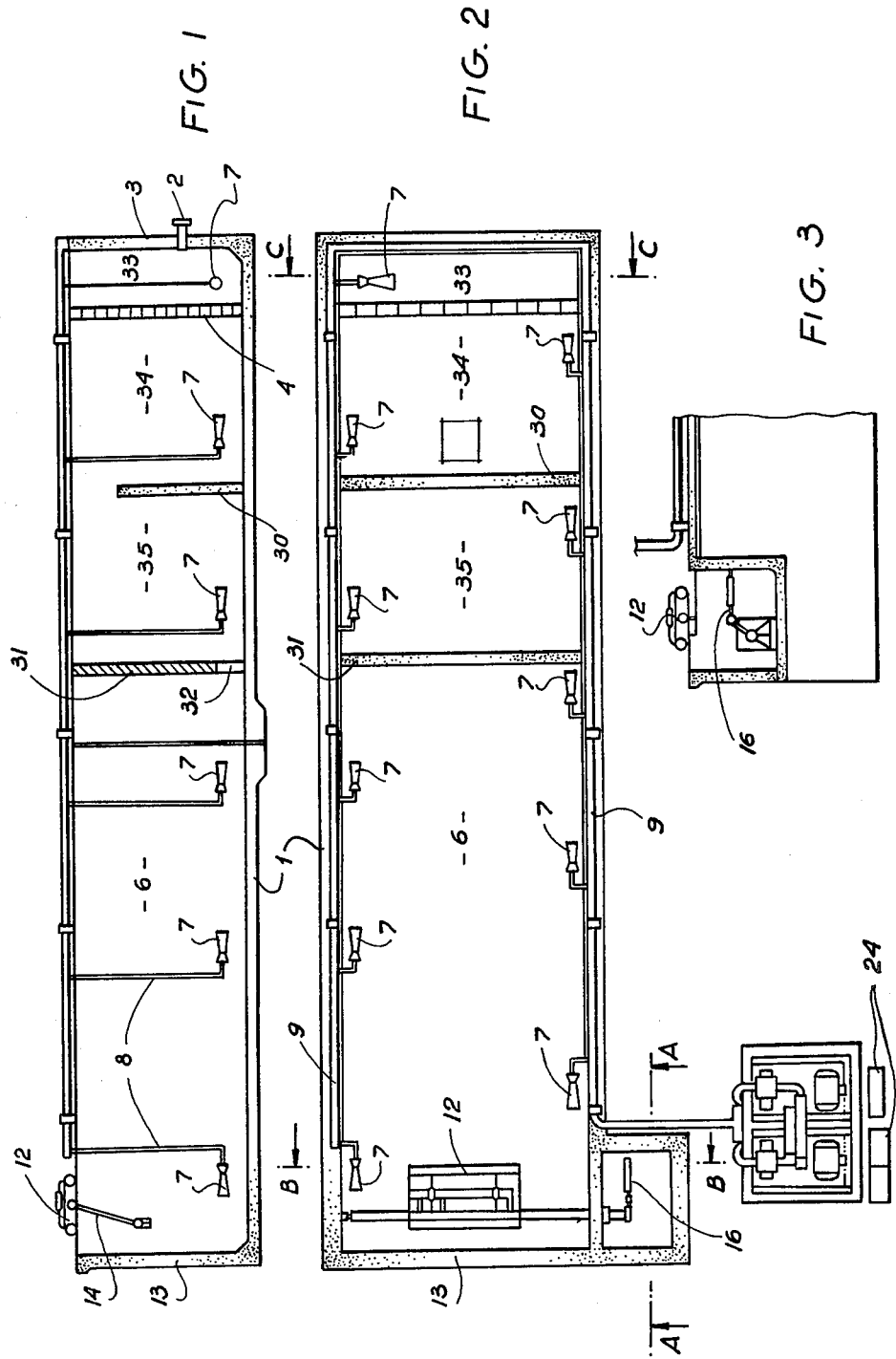

EFFLUENT TREATMENT

This is a continuation of application Ser. No. 323,592 filed Nov. 20, 1981, which was a continuation of Ser. No. 224,862 filed Jan. 14, 1981, which was a continuation of Ser. No. 81,293 filed Oct. 2, 1979, all now abandoned.

This invention relates to effluent treatment.

It is desirable to provide a system of effluent treatment utilizing the activated sludge process in an efficient manner to treat waste from industrial and domestic sources to reduce BOD5, non-filterable residue, molybdate reactive phosphorus and total kjeldahl nitrogen.

In effluent treatment it often happens that high concentrations of effluent resulting in high food to microbe ratios, have to be treated. These "shock organic loads" invariably result in undesirable settling of the effluent in the treatment tank and hence inefficient and sometimes incomplete treatment of the effluent occurs. Operations such as dairy products and vegetable/fruit cannery operations, have wastes which are typified by a biological oxygen demand strength of some 1500-2500 mg/l with the waste generation being generally random with peaks often exceeding ten times an average flow figure (viz. total daily flow/number of hours in an operational day). In many cases these wastes are not amenable to biological treatment without nutrient addition such as nitrogen and phosphorus. Generally they are wastes commonly described as having a high carbohydrate content and as such are difficult to treat by conventional activated sludge methods. Such difficulties are normally manifested by a sludge exhibiting poor gravitational solids liquid separation, a feature which is detrimental to efficient treatment.

It is therefore an object of the present invention to provide a method of treating effluent and an effluent treatment system which will go at least part of the way toward meeting the foregoing desiderata and obviate or minimise the foregoing disadvantages in a simple yet effective manner or which will at least provide the public with a useful choice.

Accordingly in one aspect the invention consists in a method of treating effluent comprising the steps of passing said effluent through an inlet into one end of a tank having a length between 3.5 and 6 times the width thereof, diffusing air into said effluent for a predetermined period of time, allowing the contents of said tank to settle for a predetermined time, and decanting liquid from the surface thereof or adjacent the opposite end of said tank from said inlet.

In a further aspect the invention consists in an effluent treatment system comprising a tank having a length between 3.5 and 6 times the width thereof, an inlet adjacent one end of said tank, air diffusers arranged to be submerged within said tank in use, air supply means arranged to supply air to said diffusers, and decanting means arranged to decant liquid from the surface of effluent held within said tank at or adjacent the opposite end of said tank from said inlet.

In the preferred form of the invention the tank incorporates a baffle wall across the width thereof adjacent said inlet, said wall having apertures adjacent the lower edge thereof for passing said effluent therethrough.

Figure 5:
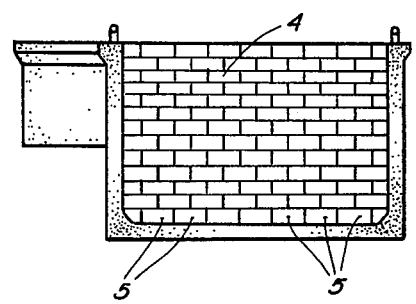
Figure 6:
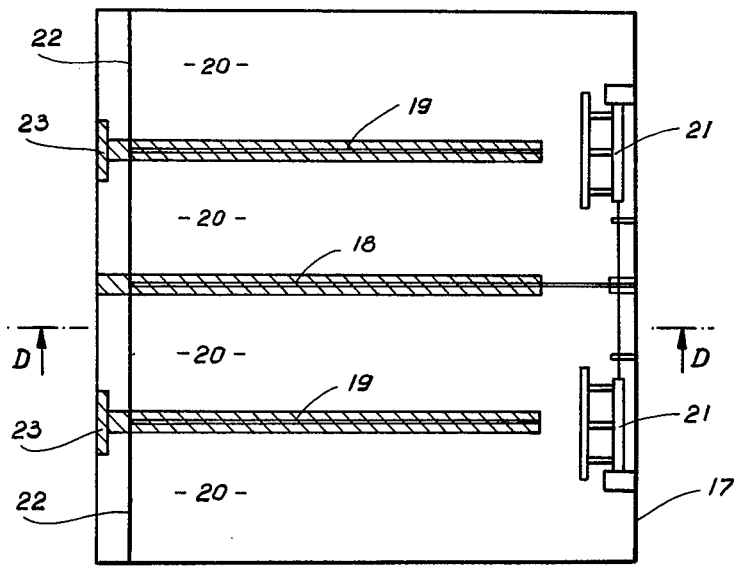
Figure 7:
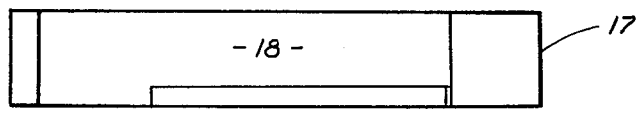

Notwithstanding any other forms which may fall within its scope the invention will hereinafter be described in one preferred form by way of example only with reference to the accompanying drawings in which:

FIG. 1 is a cross-sectional elevation of the tank of an effluent treatment system according to the invention, FIG. 2 is a plan view of the effluent treatment system according to the invention, FIG. 3 is a cross-sectional elevation along the line A—A of FIG. 2, FIG. 4 is a cross-sectional elevation along the line B—B of FIG. 2, FIG. 5 is a cross-sectional elevation along the line C—C of FIG. 2, FIG. 6 is a plan view of an alternate tank configuration for use with an effuent treatment system according to the invention; and FIG. 7 is a cross-sectional elevation along the line D—D of FIG. 6.

In the preferred form of the invention an effluent treatment system is constructed as follows:

A tank 1 is provided which may for example be constructed from reinforced concrete or from any other suitable material and which may be sunk in the ground or supported upon the surface of the ground.

In the preferred form of the invention the tank has a length equal to 4 times the width of the tank although it has been found that the system works effectively with tank lengths anywhere between 3.5 to 6 times the width of the tank, although it is preferred to keep the ratio between 4 and 5 to 1.

The tank is provided with an inlet 2 at one end 3 of the tank end and adjacent the inlet a transverse baffle wall 4 is provided which may for example be a concrete block wall. The baffle wall extends the full height of the tank and is provided with openings 5 (FIG. 5) at or adjacent to the lower edge of the baffle wall to allow effluent passing into the tank through the inlet 2 to pass through the openings 5 and into the main body 6 of the tank.

The tank is provided with a plurality of air diffusion nozzles 7 arranged to be submerged within the tank in use and preferably located adjacent the side walls close to the bottom of the tank. The nozzles are connected to dropper pipes 8 and thence to manifold pipes 9 located on the upper edge of the walls of the tank, connected to an air supply pipe 10.

An air supply apparatus 11 in the form of motor-driven compressors or blowers is provided, arranged to pump air through pipes 9 and 10 to dropper pipes 8 and hence to the diffuser nozzles 7. The diffuser nozzles may take any convenient form such as aerators, jet nozzles or bell type nozzles or any other type of diffuser.

A decanter 12 is provided, arranged to decant liquid from the surface of effluent held within the tank adjacent the opposite end 13 of the tank from the inlet 2. The decanter may take any suitable and known form but is preferably a floating weir type decanter connected by downcomer pipes 14 to an outlet pipe 15 which passes through the tank wall to suitable pumping or draining connections. The decanter may be supported from the pipe 15 by way of the downcomer pipes 14 so that the height of the decanter may be adjusted by rotating the pipe 15 by way of a crank apparatus 16.

Although the tank for the effluent treatment system has been described as a single tank having a length 4 times the width thereof, it will be appreciated that the same configuration may be achieved in a square type tank or tank of other configuration by placing baffles within the tank to break up the tank area into volumes each having a length approximately 4 times the width thereof.

Such a construction is shown in FIG. 6 in which an approximately square tank 17 is divided by way of a full length centre baffle 18 and shorter baffles 19 into 4 areas 20 each having a length 4 times the width thereof. Decanters 21 are provided in a similar manner to that shown in FIGS. 1, 2 and 4. The tank is also provided with a baffle wall 22 located adjacent the inlet 23 to the tank.

The configuration shown in FIGS. 6 and 7 has the particular advantage that it is more economical to construct, as the tank side wall length for a square tank per volume contained within the tank, is less than that needed for a single rectangular tank of the type shown in FIG. 2. The baffle walls 18 and 19 need only be constructed of a light weight material as they do not need to withstand any hydrostatic pressure operating on one side of the wall only. The tank has further economy in that a single decanter 21 may be used to decant liquid from two adjacent areas 20.

A tank as described is adequate to handle may effluent treatment demands but in some situations intermittent high concentrations of effluent resulting in high food to microbe ratios (F/M) have to be treated. To cope with these "shock organic loads" the tank may be provided with a series of additional baffles such as those shown at 30 and 31. The baffle 30 extends across the tank flush with the tank floor to a height equivalent to a minimum of the designated bottom water level. The third baffle 31 is similar to the first baffle wall 4 and may have apertures 32 adjacent the lower edge of the tank flow or may terminate short of the tank floor. The chambers formed by the baffles each have at least one diffuser nozzle 7 therein.

In use the system is designed to contain a process known as extended aeration and to operate this process intermittently 4 times a day. Each period is divided into 6 hours and is a total cycle unto itself. The tank is filled with effluent through the inlet 2 and air is then pumped from the pumping apparatus 11 through the pipes 10, 9 and 8 to the diffuser nozzles 7. A period of settling or clarification follows during which time the sludge in the tank is allowed to settle to the bottom, and the decanter 12 is then actuated for a predetermined period to draw off the clear liquid from the top of the tank. The cycle may be manually or automatically controlled from a control panel and switchboard 24 which contains starting equipment for the air blowers that provide the air for aeration, and also the equipment to actuate the linkage 16 which may be hydraulically actuated to bring the decanter 12 into operation. A sludge pump (not shown) may also be provided arranged to pump settled sludge from the bottom of the tank when desired. The sludge pump may also be controlled by the control panel 24 and may be functionally independent of each cycle of operation.

It has been found that the feature of providing a tank having a length 4 times the width thereof is important to prevent short circuiting of the effluent which otherwise has a momentum and is caused to rise due to temperature differences, to be entrained in the decanter. By making the length of the tank at least 3.5 times the width, and preferably 4 or 5 times, so that short circuiting is avoided clear liquid is able to be decanted at the decanter 12.

The basic feature of the invention is its ability to continuously accept inflows of wastewaters, without any prior load balancing, using a single vessel (or subcompartmental single vessel). Treatment and load balancing occur simultaneously. To dimensions described above are important to the hydraulic functioning of the invention and prevent direct short circuiting. The transverse baffles are also a special feature of the invention and are incorporated to serve as energy dissipators, to prevent short circuiting caused by stratification (due to specific gravity differences of effluent wastewaters and liquid contained within the vessel) and to physically contain or stop grease as floating balls which are then biodegraded.

The total sequence of aeration, settlement and decant in the cyclic operation is not necessarily specific, although total periods of 4 hours, 6 hours, and 12 hours are in common use. Any suitable combination of sequences may be used.

A further picture of the baffle or baffles as used in this invention relates to the generation of an activated sludge which exhibits good settlement properties. In vessels without baffles, similar good settlement is achieved by proper selection of the non aeration sequence. To further describe the invention it is necessary to relate to an organic loading parameter, which is defined in practice as the F to M ratio. By definition the F/M ratio is described as the unit weight of BOD applied in 24 hours divided by the unit weight of activated sludge (called mixed liquor suspended solids) held in the vessel. The unit weight in metric units is kilograms. This invention reaches to an F/M ratio of up to 0.4 calculated as stated.

In such systems the concentration of activated sludge is expressed as concentration of mixed liquor suspended solids (MLSS) or mixed liquor volatile suspended solids (MLVSS) (usually expressed as milligrams per liter) and may be in practice from 300 to 15,000 milligrams per liter.

A feature of the invention where transverse baffles are used is its ability to accept "shock organic loads" without biological upset to the process—a biological sludge of good settleability is maintained. In these systems, wastewaters are caused to be received in such a way that upon initiation of the aeration sequence an immediate F/M ratio (calculated on the MLSS solids content of the first baffled compartment) of up to 5 units in the inlet zone results. This zone and the high F/M ratio is instrumental to the efficacy of this invention in that it serves to generate the growth of micro-organisms which do not result in a sludge having poor settlement characteristics. As the aeration sequence proceeds mixed liquor from this zone proceeds to the next zone or subsequent multiple zones. A further feature of this invention is the biological activity (measured as oxygen uptake rate with units of milligrams of oxygen per gram of mixed liquor suspended solids per hour) in the various zones or sections of the vessel. Values as high as 300, at temperature up to 35° C. occur in the first inlet zone. Total biological solids in these systems is also described in terms of flux and in this invention relates to a solid content of up to 15 pounds of biological solids per square foot of vessel floor area.

The subcompartment volumes in any particular system are not easily specified as their volume is determined by the strength of wastewaters being treated. In a preferred form where two compartments are specified the volume ratio may be 1:10 to 1:3. Where more than two compartments are specified volume ratios are determined by the F/M ratio on which the total system is sized. In typical systems this may be in the ratio of 1:1:2 to 1:1:10.

What we claim is:

1. A method of treating effluent utilizing activated sludge comprising passing said effluent continuously into a tank provided with at least one transverse baffle across the tank and dividing said tank into a first portion adjacent said inlet and a second portion remote from said inlet, the volume ratio of said first portion to said second portion being between about 1:10 to about 1:3, said baffle having at least one aperture therethrough, said first portion being of such dimensions so as to operate at high immediate F/M ratios of up to 5 units, sludge with biological activity measured as oxygen uptake rate in units of milligrams of oxygen per gram of mixed liquor suspended solids per hour of up to 300 and a solids content of up to 15 pounds of biological solids per square foot of vessel floor area and said tank operating at an overall F/M ratio of up to 0.4;

aerating and mixing said effuent, at least in said second portion of the tank, so as to provide a sludge with good settlement properties;

ceasing said aeration and mixing while still allowing effluent to enter said tank through said inlet;

allowing sludge in said second portion to settle;

decanting treated effluent from said second portion of said tank at a point remote from said inlet;

and repeating said aerating, settling and decanting to treat further effluent.

2. A method as claimed in claim 1 wherein said step of diffusing air into said effluent comprises submerged diffused aeration.

3. A method as claimed in claim 2 wherein said aeration comprises jet aeration.

4. A method as claimed in claim 1, wherein said tank incorporates further transverse baffles across the width of the tank between said one transverse baffle and the end of the tank remote from the inlet, successive baffles having openings or apertures therearound or therethrough, the volume ratio of each preceding portion to the final portion generated by said baffles being at least 1:10.

5. A method as claimed in claim 4 wherein air is diffused into each compartment formed in said tank by said transverse baffles during said step of diffusing air into said effluent.

6. A method as claimed in claim 4, wherein one further transverse baffle is incorporated, and the volume ratio of the three portions at the tank thereby established is between about 1:1:2 to about 1:1:10.

7. A method as claimed in claim 4, wherein the effluent in the tank is forced to be passed alternately under and over successive baffles.

8. A method as claimed in claim 1, wherein said tank is provided with air diffusers, air supply means arranged to supply air to said diffusers, and decanting means arranged to decant liquid from the surface of effluent held within said tank at or adjacent an end of said tank opposite from said inlet.

9. A method as claimed in claim 8, wherein said tank is further provided with control means arranged to actuate said air supply means for a predetermined period of time, leave a rest period for a predetermined period of time, and then actuate said decanting means.

10. A method of treating effluent utilizing activated sludge comprising passing said effluent continuously into a tank having a length about 3.5 to 6 times the width thereof, provided with at least one transverse baffle across the tank and dividing said tank into a first portion adjacent said inlet and a second portion remote from said inlet, the volume ratio of said first portion to said second portion being between about 1:10 to about 1:3, said first portion being of such dimensions so as to operate at high immediate F/M ratios of up to 5 units, sludge with biological activity measured as oxygen uptake rate in units of milligrams of oxygen per gram of mixed liquor suspended solids per hour of up to 300 and a solids content of up to 15 pounds of biological solids per square foot of vessel floor area and said tank operating at an overall F/M ratio of up to 0.4;

aerating and mixing said effluent, at least in said second portion of the tank, so as to provide a sludge with good settlement properties;

ceasing said aeration and mixing while still allowing effluent to enter said tank through said inlet;

allowing sludge in said second portion to settle;

decanting treated effluent from said second portion of said tank at a point remote from said inlet;

and repeating said aerating, settling and decanting to treat further effluent.

* * * * *